(12) United States Patent
Schemm (10) Patent No.: US 7,385,363 B2
(45) Date of Patent: Jun. 10, 2008

(54) LINEAR MOTOR HAVING PROGRESSIVE MOVEMENT CONTROL

(75) Inventor: Eberhard Schemm, Lohr am Main (DE)

(73) Assignee: Rexroth Indramat GmbH, Lohr am Main (DE)

( * ) Notice: Subject to any disclaimer, the term of this patent is extended or adjusted under 35 U.S.C. 154(b) by 0 days.

(21) Appl. No.: 10/566,807

(22) PCT Filed: Jun. 17, 2004

(86) PCT No.: PCT/EP2004/006509

§ 371 (c)(1),
(2), (4) Date: Sep. 6, 2006

(87) PCT Pub. No.: WO2005/033813

PCT Pub. Date: Apr. 14, 2005

(65) Prior Publication Data

US 2007/0013328 A1    Jan. 18, 2007

(30) Foreign Application Priority Data

Jul. 29, 2003   (DE) ................ 103 34 736

(51) Int. Cl.
*H02P 1/00*    (2006.01)

(52) U.S. Cl. ............. 318/135; 318/138; 318/609; 318/687

(58) Field of Classification Search .......... 318/135, 318/138, 609, 610, 687

See application file for complete search history.

(56) References Cited

U.S. PATENT DOCUMENTS

| | | | |
|---|---|---|---|
| 4,135,120 A * | 1/1979 | Hoshimi et al. ............ 318/138 |
| 5,023,495 A | 6/1991 | Ohsaka et al. | |
| 5,610,491 A | 3/1997 | Gotz et al. | |
| 5,880,586 A * | 3/1999 | Dukart et al. ............ 324/207.2 |
| 5,965,963 A | 10/1999 | Chitayat | |
| 6,118,245 A | 9/2000 | Sienz et al. | |
| 6,502,517 B1 | 1/2003 | Groening et al. | |
| 2002/0180279 A1 | 12/2002 | Faizullabhoy et al. | |
| 2002/0185358 A1 | 12/2002 | Zeitler et al. | |

FOREIGN PATENT DOCUMENTS

EP   0 580 107   1/1994

* cited by examiner

*Primary Examiner*—Rina Duda
(74) *Attorney, Agent, or Firm*—Kenyon & Kenyon LLP (57) ABSTRACT

In a linear motor and its progressive motion or motion control, e.g., for modular transport devices with straight and curved route sections forming a route course, extensive modularity or flexibility of the linear motor may be guaranteed with little expenditure in terms of equipment and software, e.g., with regard to various applications or machine configurations, e.g., when a plurality of secondary parts are used. A secondary part may have at least one permanent magnet and a signal processing device with a progressive motion or motion controller, which generates at least one set value relevant to the coil control. A set value is fed as a magnitude for commutation using a set value interface of a coil control that is stationary relative to the primary part. Device(s) are also provided for rigidly positioning the secondary part, the device(s) guiding the secondary part along a predetermined stretch.

55 Claims, 5 Drawing Sheets

LINEAR MOTOR HAVING PROGRESSIVE MOVEMENT CONTROL

FIELD OF THE INVENTION

The present invention relates to a linear motor having progressive movement control, e.g., a linear motor having a plurality of secondary components (moved components), the linear motor, e.g., being used in processes of industrial automation.

BACKGROUND INFORMATION

U.S. Pat. No. 5,965,963 describes a linear motor made up of a secondary component and a primary component (stationary component), the secondary component implementing the triggering of the coils integrated in the path with the aid of position-sensing sensors such as Hall-effect sensors (FIG. 1B, FIG. 3), which are mounted along the path, and with the aid of a magnet situated on a secondary component. This may have the disadvantage that the mechanical system for sensing the position becomes increasingly more and more complex as the number of secondary components is increasing, reaching its limit with four to six secondary components (FIG. 10). Moreover, it is more difficult to expand an existing path since the implementation of rail and secondary component depends on the number of secondary components. Also, the already existing control has been configured for the specific application case, and a modification of the system configuration requires considerable time and technical effort. The concept of using position sensing may also have the disadvantage that the generated signal will be falsified if even a single sensor breaks down, so that an eventual collision or a malfunction is thus virtually preprogrammed. In addition, the wiring required for analyzing all sensor signals is considerable. This may drastically increase the susceptibility to faults, in particular under adverse circumstances.

U.S. Pat. No. 5,023,495 describes a d.c. linear motor, which theoretically has an infinite number of secondary components that can be controlled independently. Here, the position is sensed with the aid of, for instance, permanent magnets affixed on the secondary component whose magnetic field is sensed by sensors (FIG. 7, reference numerals 8, 46) mounted on the primary component. No further description of the control of the secondary components is provided. The description essentially encompasses the mechanical configuration of primary and secondary component as well as their cooperation. It may be disadvantageous that an external control would have to assume the entire process coordination and only straight movement paths can be realized.

U.S. Patent Application Publication No. 2002/0180279 describes a modular system made up of linear motors. FIGS. 17 through 21 illustrate the flexibility of the system based on the realization possibility of movement paths that, theoretically, have any configuration. In one illustrated potential realization form, the secondary component includes a battery-powered signal-processing device (FIG. 5), which carries out the position sensing by remote control via radio and reports it to a central control unit. However, the configuration of the secondary and primary components is similar to the design disclosed in U.S. Pat. No. 5,965,963 and hence may have the same disadvantages. Here, the movement is controlled by a central motor controller, which communicates with module controllers via a network and therefore controls and administers all secondary components. With the aid of the received position data, the controller network must calculate all information relevant for the movement control such as acceleration, speed, shear force, and trigger the coils accordingly. The control of the secondary components becomes more complex with each increase in the number of secondary components since the position must be detected for every secondary component, and the corresponding coils on the path formed by the primary components must be switched such that all secondary components move completely independently of each other and collisions are prevented. In addition, to avoid losses, only the coils that are directly underneath the secondary component should be triggered.

U.S. Pat. No. 6,502,517 and European Published Patent Application No. 0 580 107, which both relate to magnetic levitation systems, also should be mentioned in this context. U.S. Pat. No. 6,502,517 discusses the mechanical and electrical aspects of such a system realized with the aid of a linear motor and proposes a design approach for the non-contacting transmission of electrical energy for electrical components on the floatingly supported secondary component. The contents of European Published Patent Application 0 580 107 describes a levitation system, the focus being on, among others, the control of the air gap as a function of the loading of the suspended component. For this purpose, the moved component includes a control unit, which permanently monitors the air gap and initiates appropriate countermeasures as soon as the required setpoint changes. The essence of the distance control are electric magnets, which are mounted on the moved component and via whose current supply the path distance is able to be adjusted.

SUMMARY

An example embodiment of the present invention may provide a linear motor such that, e.g., when using a multitude of secondary components, far-reaching modularity and flexibility may be provided, e.g., with respect to different applications or machine configurations, this being accomplished with a minimum of equipment and software. In order to be able to offer a modular system that is rapidly and easily adaptable to a wide variety of problem definitions, it may be provided that the number of secondary components is not restricted, so that the user may set up all types of conveyor systems having freely defined paths. One part of the movement controller is structurally provided on the secondary component such that the secondary component itself assumes a share of the computer-intensive movement control. This may significantly reduce the load on a possibly provided controller. The secondary component thus becomes a practically autonomously acting, intelligent unit, which, from an input of setpoints such as path inputs, and through the independent determination of actual values such as absolute position data, for instance, is able to initiate all actions for progressive movement on its own. In this manner, a local triggering of the required coils may be achieved in a simple manner, the setpoint then being used only for the coil controllers that are required to drive the secondary component in the desired direction or at the desired speed, etc. Such a movement control is practically a decentralized version or at least a partially decentralized version of the control, the movement control loop being split The secondary component is provided with an energy supply for this purpose. This energy supply of the secondary component feeds a signal-processing device, which has a movement controller or progressive movement controller and is structurally situated on the secondary component. The movement controller or progressive movement controller hence is part of the overall movement control of the linear motor. For instance, a positional setpoint, a velocity setpoint, etc., (see further down) also may be generated by a centralized or decentralized controller, such as a stationary controller, and transmitted to the secondary component. From this, the secondary component may generate a setpoint current, which is used to trigger coils mounted on the primary component or which is utilized as input signal of the coil controller.

This (current) setpoint is generated in the signal-processing device and is relevant for the triggering of the coils, i.e., for the physical conversion of the desired movement. Here, relevant means that the physical motion resulting from the triggering of the coils and from the field resulting therefrom takes place in accordance with the setpoint generated in the signal-processing device.

The setpoint may be transmitted to a stationary coil controller. This is done via a setpoint interface.

The setpoint interface is used to transmit the setpoint from the secondary component, which usually is the driven component, to the stationary coil controller. The setpoint is then used for the commutation of the coils according to the control of a linear motor. The required wiring for transmitting the setpoint or for triggering the coils, for instance, is relatively simple. In contrast to a centralized or partially centralized controller with a centralized or partially centralized generation of the setpoint, the wiring hereof is not based on the number of provided coils and may therefore be implemented very inexpensively and efficiently even if very long paths or a multitude of secondary components are/is involved. In the extreme case, a setpoint transmission from a centralized or decentralized control architecture to the coils of the primary component may also be dispensed with entirely.

Using an example embodiment of the present invention, it may be possible to set up any type of path with a very low investment in hardware and wiring.

In this sense, the logic, i.e., "intelligence" that needs to be provided in the primary component for each individual coil may be practically non-existent or may be reduced to a minimum. This also applies to the drives of the corresponding coils. Details of the power components of the coils will be discussed in greater detail below.

Using an example embodiment of the present invention, applications are possible which function completely without external control signals in that the secondary component is equipped with a processor and a memory and the memory includes the entire movement sequence in the form of program code and/or position data. Traveling the predefined position inputs may require position sensing, which is possible in the form of an active device energized via the energy-supply interface and situated within the signal-processing device, or which is situated separately therefrom on the secondary component. This device senses the position of the moved secondary component relative to the path formed by the primary component and works in a completely autonomous manner. For position sensing, a raster affixed on the primary component along the path may suffice, which is scanned via a transceiver mounted on the secondary component and analyzed by a simple counter, for example. The position sensed in this manner, which may be relative or absolute, is compared with the stored position data and thereby allows a precise progressive movement control. For instance, the sensing of the absolute position of the secondary component is realizable by providing each modular path section with a unique marking, i.e., a marking that is used only once in the overall path. This may be a path-segment marking using binary code, which is detected by the scanner and analyzed. Using the combination of path-segment marking and the sensed relative position within a path segment, it may be possible to calculate the absolute position in the overall path. In the event of a system failure or a derailment of the secondary component, the re-initialization may also be simplified considerably since the homing (traveling of the path for repositioning) that is common in such a case may be greatly simplified in this manner. The secondary component may thus be able to travel any given movement path without external position inputs, such path being programmable and thus modifiable by changing the program code and/or the position inputs. This adaptation of the progressive movement inputs may be possible even during operation, by memory media able to be plugged in, or by using a suitable data interface. A virtually unlimited application spectrum may open up as a result.

For a further increase in the flexibility, it is possible that the secondary component obtain movement-state information, e.g., according to the velocity and/or acceleration and/or the relative or absolute position, and/or the shear force, via at least one sensor interface, from a movement-state sensor which is mounted in the region of the primary component. Having the movement-state information relating to the secondary component at its disposal, the movement controller on the secondary component possesses a high degree of "intelligence". The secondary component then has the information of its movement state available virtually at all times, so that movement sensing, for the purpose of collision monitoring, for instance, may be implemented on the secondary component. Furthermore, such movement-state information also may be used for a preprogrammed position control. When the secondary component receives these movement setpoints, a very rapid movement control may be ensured on the secondary component itself, which takes a wide variety of parameters into account similar to a conventional control.

Example embodiments of the present invention may realize practically the entire variability and basic bandwidth of a conventional centralized or partially centralized control architecture in the simplest fashion if the secondary component receives movement setpoints from at least one control device, e.g., according to the velocity and/or the acceleration and/or the relative or absolute position and/or the shear force, via at least one control interface mounted in the region of the primary component.

The task of the control device then consists (e.g., only) of controlling or synchronizing—for instance as stipulated by an industrial process as outlined below—the movement of a secondary component or a plurality of secondary components, as mandated by the underlying required process such as a manufacturing process. The control device as well as the communication between the control device and the secondary component(s) may be considerably simplified in this manner since the control device no longer has the burden of carrying out the aforementioned movement control processes. As a result, complex and predefined paths and movement inputs may be realized and, in particular, also a plurality of secondary components may be controlled in a synchronous manner according to the inputs of even complex processes.

If at least one control device is set up in a decentralized manner and includes control modules disposed in the region of the primary components, advantages hereof may be combined with a decentralized controller architecture. This may reduce the complexity of the overall system, so that more complicated application cases than conventional systems may be realized by distributed computer outputs and, in particular, distributed "intelligence" of the controller(s).

The possibilities of realizing different processes as well, or of programming such processes in the preliminary stages may be increased in that the control device administers specific features of at least one secondary component, e.g., identifying features, for the control thereof and implements a transmission and reception via a control interface. Set-up processes or start-up processes, for instance, may be implemented in a much simpler manner if such specific features are available. When a process is started or resumed, specific, control-relevant features of a secondary component, a plurality of secondary components, or of all secondary components situated in a path section may be queried and used to initialize the process. During the process, the control device may utilize such specific features to administer or handle the particular process. To accomplish this, the specific features are transmitted from the secondary component to the control device via a control interface. It may therefore be preferred if the control interface has a bidirectional design. The specific features (in particular for the start-up or the resumption) may be technical features of the secondary component that are relevant for the control. As an alternative or in addition, however, these may also be features that are predefined for each secondary component in advance.

The specific features of the secondary component, e.g., the identifying features, may also be used in the signal-processing device of the secondary component itself. This may be provided, for instance, for identifying technical data of the secondary component during the control, such as parameters that are relevant for the movement control. This may considerably broaden the utilization spectrum of a linear motor and may simplify the control at the same time.

To allow an unequivocal control and identification of each secondary component beyond the technically required data, it may be provided that at least one identifying feature be a unique address that addresses at least one secondary component. Unique means that the particular address is predefined only once for each secondary component and thus is unambiguous.

To reduce susceptibility to faults and to limit the service requirements, it may be provided that the control interface or the sensor interface or the setpoint interface be implemented as non-contacting interface. This may dispense with the corresponding wiring, so that the mechanical limitations of the movement that are usually associated with the wiring may be avoided or reduced. The system's susceptibility to faults, for instance as a result of cable fracture, which may be more likely with increased by mechanical loading, may be reduced. The design may be simpler and also more cost-effective overall due to the reduced wiring complexity, and the required servicing of the wiring and plugs, for instance, may be avoided or reduced as well.

Various arrangements of non-contacting interfaces are possible in this context. The choice of the interface technology or interface physics may be based on the data-transmission rate to be realized and the type of data to be transmitted, and also on the specifications of the particular interface.

To set up an interface having a relatively high data-transmission rate, it may be provided that at least one of the interfaces be arranged as infrared interface and that the sensor system optionally be shielded from the environment in a fluid-tight manner by a transparent seal. Such an infrared interface may allow high data rates to be modulated due to the high frequency of the infrared light. The interface may have a unidirectional and/or a bidirectional configuration. For example, it may be possible that the entire region of the primary component traveled by a corresponding secondary component is irradiated by one or a plurality of infrared sources. Each secondary component communicating via the infrared interface may then be equipped with at least one infrared receiver, which converts the infrared signals and makes them accessible to the movement controller of the secondary component. Such an infrared interface between the primary component and the secondary component also may be implemented in the form of a rail, the infrared transmitter and infrared receiver being situated in distributed fashion parallel to the path route in the longitudinal direction, in accordance with the geometry, so that a continuous and largely uninterrupted transmission may be ensured also when the secondary component is moving relative to the primary component as required by the movement of the secondary component. For this purpose, the corresponding transmitters and receivers may be integrated in the rail and positioned in encapsulated form such that incident light and also contamination of the infrared sensors or transmitters is largely avoided. A practical solution may be to arrange the control interface as a field bus, which may ensure that the position data, etc., is transmitted to the secondary component or to each secondary component virtually in real time.

To provide a non-contacting interface that has the lowest possible susceptibility to faults and high functional reliability, at least one interface may be arranged as inductive interface. Such an inductive interface may be largely indifferent to contamination, incident light or other external influences. In addition, an inductive interface may be arranged to be completely isolated from the environment, for instance with the aid of a tight cover. Such an interface may also be arranged as an absolutely watertight and fluid-tight interface by casting it of an appropriate material such as epoxy resin. This may be provided particularly with packaging machines or industrial applications where heavy contamination is to be expected.

The same applies if at least one interface is arranged as radio interface. Such a radio interface may provide that higher transmission rates, such as required for a field bus, for example, are realizable as well. Moreover, practically any distance may exist between transmitter and receiver, so that the flexibility in use may be increased considerably.

To produce the interfaces in a more cost-effective and less complex manner and in order to utilize the available interfaces as efficiently and completely as possible, it may be provided that at least two interfaces, e.g., the control interface and/or the sensor interface, and/or the setpoint interface, be combined into at least one unified interface.

To adapt the setpoint to be transmitted to the available data rate in the transmission of the setpoint information, it may be provided that the setpoint generated by the signal-processing device belong to a single setpoint category. This means that an individual setpoint of a specific, predefined type will be generated by the signal-processing device during operation.

The setpoint generated by the signal-processing device may be a position setpoint. A corresponding signal processor, which forms a setpoint for the coil triggering from the position setpoint, may be provided on the primary component. This may reduce the required data rate in the data transmission since such a position setpoint may require a lower data-transmission rate than a current setpoint, for instance. The same generally applies if the setpoint generated by the signal-processing device is a speed setpoint. The linear motor may be arranged such that the setpoint generated by the signal-processing device is a current setpoint or an acceleration setpoint. A relatively large part of the required logic circuit may be situated on the secondary component, so that the complexity of the circuits in the primary component may be very low. In particular when a long path is involved, this may provide that the resulting overall complexity of the logic circuits is reduced drastically. In a similar manner, the signal-processing device also may generate a voltage setpoint, resulting in an higher demands on the bandwidth of the setpoint interface.

If sufficient transmission capacity or bandwidth is available, the possible operation bandwidth may be increased in that the setpoint generated by the signal-processing device represents a combination of setpoint categories.

The secondary component may require an energy supply for the movement controller. It may be provided that the energy supply of the signal-processing device of the secondary component is provided by a single type of energy source, since this may simplify the incorporated energy supply.

This applies all the more if the energy supply of the signal-processing device of the secondary component is an energy source mounted on the secondary component, e.g., a chargeable accumulator or a non-chargeable battery or a solar-cell system. Such an energy source may be sufficient for a signal-processing device hereof since the energy requirement is relatively low.

To ensure a permanent, uninterrupted energy supply of the secondary component it may be provided that the energy supply of the signal-processing device of the secondary component be an inductive energy interface, e.g., an induction coil, which takes up electrical energy in a non-contacting manner via at least one coil, which is stationary relative to the primary component.

For a compact system and a reliable as well as permanent energy supply, a pick-up mounted on the secondary component and in contact with the primary component may conduct the energy to the signal-processing device, e.g., via a sliding contact or a roller contact.

The energy for the signal-processing device of the secondary component may also be conveyed to the secondary component by a cable connection. Such a cable connection may provide an inexpensive alternative solution. Moreover, a cable connection may largely preclude interference effects. This may be advantageous especially when relatively low voltages/currents are transmitted, so that malfunctions by superpositions may be preventable in this manner.

Combinations of the aforementioned energy sources are possible as well. For instance, an accumulator may be possible as backup energy supply, while the energy during operation is supplied by an inductive, sliding, rolling or cable connection. The accumulator may be charged by the "operating energy source" and may assume the power supply if need be.

Non-contacting energy transmission and/or data transmission device(s) may be provided. In order to ensure a compact arrangement and the most reliable and faultless transmission of the individual signals, it may be provided that, for the non-contacting transmission of energy and/or for the non-contacting transmission of data, the device(s) of the secondary and primary components communicating with one another be situated opposite each other during operation, on the sides of the secondary component and primary component facing each other.

A more precise movement may be realizable by the triggering of individual coils, i.e., such that individual coils on the primary component are positioned next to each other along the movement path of the secondary component, and the coil controller supplies energy to at least one individual coil.

It may be provided that the secondary component is moveably supported on the primary component with the aid of a rail having at least two tracks. A support on two tracks may be possible with the aid of example embodiments of the present invention since it will leave enough free space to realize the required interfaces. Due to the flexibility of example embodiments of the present invention, such support on two tracks may be easy to implement mechanically as well. Due to the two-track support, the mechanically stable guidance of the secondary component is realized in the region of the primary component. The rails and the associated guideways may be provided on the side of the secondary component and also on the top or bottom.

A roller bearing may be provided such that the secondary component has at least three rollers, two rollers being assigned to a shared track, and a third roller being assigned to an additional track. This may ensure reliable guidance on the rails or the rail guides even when traveling along a curve, e.g., a curve having different radii.

It may also be provided that the particular roller situated opposite the two other rollers be flexibly supported on the secondary component. In curve travel, the third, flexibly supported roller may then comply with the particular curve constraint by giving way as required or adapting its position to the posed constraint. In addition, the flexible support of the roller may ensure even cornering.

Example embodiments of the present invention may improve the coil trigger device such that required hardware may be relatively minor and the susceptibility to faults may be reduced. Since each trigger element may be arranged as half-bridge, a multitude of components may be saved compared to an H-bridge, for instance. The savings may be proportional to the specific length of the path. In particular in the case of complex processes and large machines, this may result in considerable material savings and simplification of the circuits. Especially with industrial machinery, a loss of production may cause considerably expense. Since much fewer components may be used overall, the likelihood of a malfunction may be reduced drastically. The savings in components may be reinvested, for instance, by using undoubtedly more expensive, but therefore more reliable and less fault-susceptible components. Given market prices, such components (IGBT's) may still cost less, yet provide a considerably longer service life and better reliability.

The aforementioned features may be multiplied by the number of coils installed in each case. It is therefore possible that a number n of control elements arranged as half-bridges be connected to an individual coil of n affixed on the primary components. Since the half-bridges are realized in a redundant manner, at an expense that is comparable to a corresponding H-bridge, a standby controller may be available in case of a malfunction. In view of the consequences of a production loss, the attendant expense may be justifiable.

Example embodiments of the present invention may be implemented in an industrial machine, e.g., for automated lanes, which includes an industrial process, specifically for flat stocks, packaging and tools, the process involving a linear movement executed along a predefined path by a linear motor including a movement controller, having at least one secondary component and at least one primary component having field-generating coils in concentrated or overlapping windings, such that it is able to be used for a wide variety of application fields and for a multitude of different configurations, relatively high accelerations and high rigidity of the movement being realizable as well, if need be.

Such a machine may provide all of the features already mentioned above. However, it is precisely high flexibility and various application fields and different configurations—for instance in a product rearrangement—that may be of significance with industrial machinery. As mentioned earlier, such flexibility may be ensured hereby. In this manner, the linear motor, i.e., the principle of the linear motor, may be made available for an industrial machine of the type mentioned at the outset, in a simple manner and up to the point of production readiness.

Due to the simplification of the control processes already described earlier, advantages of an industrial machine may be utilized in an especially efficient manner hereby if the machine includes a plurality of secondary components which execute a process-synchronous movement according to predefined process rules. A plurality of secondary components may entail increased complexity of the associated control process. Moreover, in an industrial machine the individual secondary components may be also be moved in a process-synchronous manner, i.e., be synchronized, relative to one another. This synchronization of the secondary components may be implemented according to predefined process rules as specified by the industrial process forming the basis and executed by the machine. Example embodiments of the present invention may provide special advantages in this context. For instance, various processes encompassing different movements and different numbers of required secondary components may be realized at relatively low cost. Also reduced to a minimum may be the expense in a start-up or refitting of the production, i.e., a change in the production, since in a refitting or start-up, for instance, a possibly existing controller is limited to the administration of the industrial process, the control processes, which may even be more complex, being carried out in a decentralized manner in the secondary components. This may simplify the corresponding control program, and thus may also ensure a more rapid and reliable start-up or refitting of the machine. The control may become more independent, or even completely independent of the hardware. In the extreme case, for instance, a control may be parameterized simply by inputting the boundary conditions and parameters that are relevant exclusively for the process. Such parameters are, for example, the paths, movement parameters of the process, number of secondary components and primary components.

Due to the reduced overall complexity as a result of the distributed intelligence, example embodiments of the present invention may provide advantages in a particularly efficient manner if the machine has at least five secondary components. Such a machine typically may also have considerably more than five secondary components, for instance, 20 to 100 or several hundred secondary components. Since the "control intelligence" is largely realized in the secondary component and primary component, i.e., in the components itself, the number of secondary components may be virtually unlimited given the processing power of controllers.

This may allow the number of secondary components to be freely defined. Depending on the process, it may be limited solely by the process specifications, the geometry of the secondary components and the path design of the primary component.

A path having great variability in arrangement may be provided by predefining the linear movement by a movement path formed by a plurality of primary components. Different primary components each having a different predefined length may be used in this context, so that a path may be set up in the manner of a kit, for instance. Such a kit may include straight or curved primary components, which are then freely selectable in accordance with the envisioned path. In particular, straight pieces having different lengths, and curved pieces having different overall lengths and different radii of curvature may be present. Thus, most if not all of the industrial processes in use in the mentioned branches of industry may be covered. In particular, individual elements, e.g., having different rising or falling slopes may be provided as well, so that, overall, a path in a machine may be implemented on different levels.

A higher-order process controller may monitor and control movement sequences. Such a higher-order process controller may have the aforementioned advantages. In addition, if a plurality of available secondary components is present, the process controller may guard against a collision of secondary components by a programmed collision protection.

The process controller may also implement an initialization of all secondary components during start-up or in the event of a fault, or in a production conversion and a production resumption. Under these circumstances, the reproducibility of the process to be implemented may be ensured at all times, all advantages hereof, e.g., being available.

To eliminate or reduce transition faults between two primary components and to ensure continuity of the production sensing, it may be provided that the process controller monitor and control the transition of the secondary components between two primary components.

The packing industry, e.g., makes many different demands on the path geometry and the movement characteristics of secondary components. Therefore, it may be provided that a machine for the packaging of goods, in particular food items or luxury food stuffs, is involved. Example embodiments of the present invention may cover all types of packaging machines: foil-seal machines, stretch-film bundlers and shrink tunnels, tray and wrap-around packagers for carton packaging, etc.

To prevent soiling or malfunction of the machine, it may be provided that its components be waterproof or splash-proof.

Example embodiments of the present invention may have virtually no limitation with respect to the path geometry. For instance, the entire path or portions of the path may be arranged horizontally/vertically on top of one another, and a movement may take place into a horizontal plane, between different horizontal planes, or in a vertical plane. Even a combination of paths having an autonomous design may be used together in order to find a solution for an automated process.

In this manner, the application spectrum of the technology hereof may be open to practically all branches of industrial automation requiring a linear movement. A production line having one or a plurality of tool machines, for example, may require especially complex systems. It is therefore possible that the subfunction of a tool machine is involved or the function of an automated lane or conveyor lane.

The simplicity in terms of control engineering, the high rigidity and excellent positioning accuracy hereof may come to the fore, e.g., when a printing machine is involved. This may be a sheet-fed printing machine, where the linear path may be provided for the conveyance of sheets. The sheet to be conveyed in linear fashion is clamped between two adjacent tracks by two adjacent secondary components traveling along these paths.

DETAILED DESCRIPTION

Figure 1:
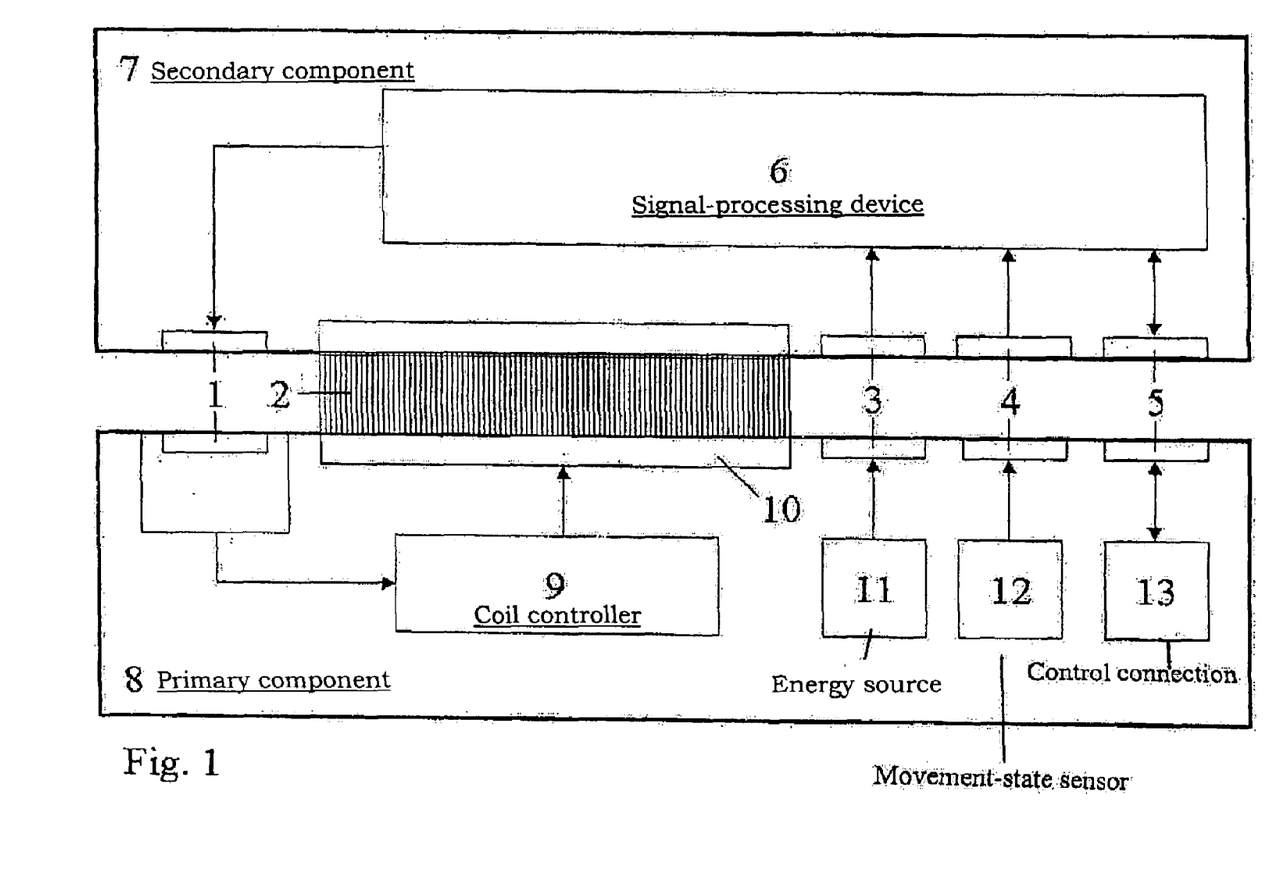
FIG. 1 is a schematic cross-sectional view of a linear motor configured according to an example embodiment of the present invention.

The linear motor illustrated in FIG. 1 includes a secondary component 7 and a primary component 8. The illustration is merely an example. For clarity, it illustrates only a single secondary component 7 in a sectional view. Primary component 8 forms a route, e.g., traveled by a plurality of secondary components 8 simultaneously.

Control connection 13 may ensure the connection to a controller, which is set up in a centralized or decentralized manner and implements the coordination of the movement process or of an entire industrial process. Control information is transmitted to corresponding and oppositely situated control interface 5 of the secondary component in a non-contacting fashion via control interface 5 on the primary component, which may be implemented as inductive, bidirectional interface in the specific example. Control interface 5 of the secondary component is connected to a signal-processing device 6, which analyzes the data received from the controller and in turn possibly supplies updated movement data to the controller. Via another non-contacting interface, a movement-state sensor 12 provides position information to signal-processing device 6. These data are used by signal-processing device 6 to record the instantaneous position of the associated secondary component relative to the primary component. Energy source 11, situated on the secondary component, supplies electrical energy to signal-processing device 6 on secondary component 7, also in a non-contacting manner, the energy being required to operate signal-processing device 6. The transmission of process energy for an electric tool mounted on the secondary component, for which a cable connection, for instance, may otherwise be required, is possible as well. Such a tool may be welding tongs of a machine for packaging food items. The welding tongs have the task of implementing an airtight seal of the foil in which the food items are packaged by sealing the foil ends. Field-generating device 10 may include, for instance, windings mounted on the primary component, which generate a traveling field along the movement path of the secondary component. Passive magnets whose magnetic field is in reciprocal action with the traveling field are affixed on the secondary component. The cooperation between traveling field and stationary magnetic field thus causes the secondary component to be moved relative to the primary component. The triggering of a field-generating coil is implemented by coil controller 9, which receives inputs regarding the required field strength via setpoint interface 1. Setpoint interface 1 may be realizable as infrared interface, for example, which may usually handle a transmission bandwidth of approximately, e.g., 16 Mbit/s. The use of an infrared transceiver as it is utilized for data transmission in personal computers or PDA's, for instance, is possible. The setpoint may be a current setpoint, which is directly proportional to the intensity of the magnetic field and thus to the acceleration of the secondary component. Via a fourth non-contacting interface, setpoint interface 1, the current setpoint is directly provided by signal-processing device 6 of secondary component 7. Signal-processing device 6 directly derives this setpoint from the data it obtains from sensor interface 4 and control interface 5. The data from control interface 5 may be a position setpoint from which signal-processing device 6 calculates the required acceleration and velocity as a function of the path to be traveled, and then requests the necessary traveling field strength via the current setpoint.

Figure 2:
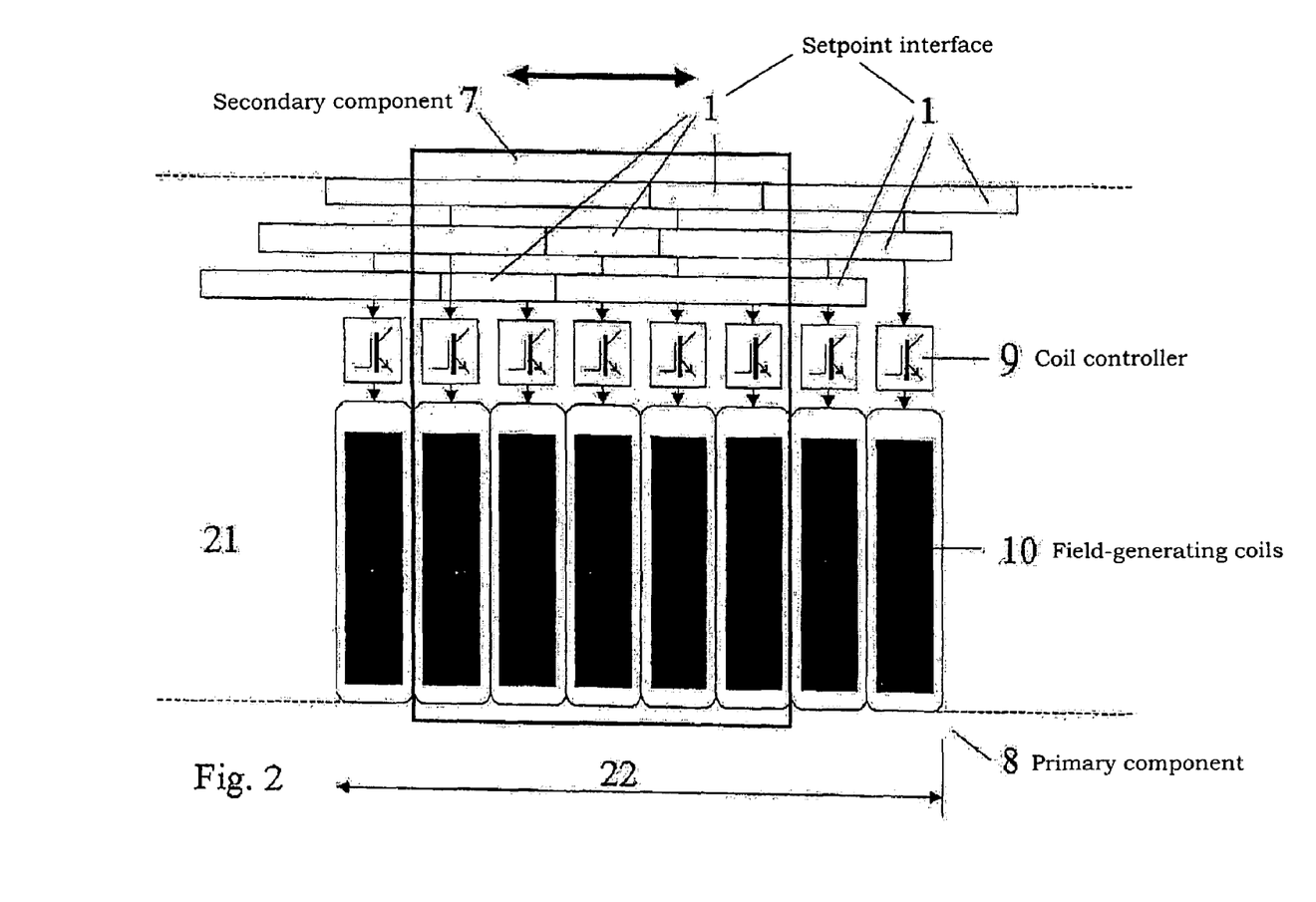
FIG. 2 schematically illustrates the commutation of the coils via the setpoint.

FIG. 2 shows a plan view of a cutaway portion of a path 21 formed by primary components by coils triggered in a three-phased manner. Once again, for reasons of clarity, only one secondary component 7 and only one path section 22 are illustrated. This secondary component 7 is able to move above path 21 in a forward and/or reverse direction along the arrows shown. A rigid support of the secondary component may be implemented by rollers and tracks, for instance; however, a magnetic levitation system may be possible as well. Here, the transmission of the setpoint from signal-processing device 6 of secondary component 7 via setpoint interface 1 of the secondary and primary components is implemented via a separate interface for each of the three phases, which is why three setpoint interfaces 1 have been drawn in next to one another on secondary component 7, but at a mutual offset in the direction of movement. Each of the three segment-type setpoint interfaces 1 of primary component 8 triggers a group of windings 10 in parallel, via corresponding setpoint interface 1 of primary component 8, in this manner providing an in-phase current supply. Only those coils are supplied with current that are actually required to drive secondary component 7, i.e., those windings that are underneath or directly in front of secondary component 7 at that point. This principle of the coil triggering as a function of the position of the secondary component may effectively limit, among others, the power losses of the conveyor system.

Figure 3:
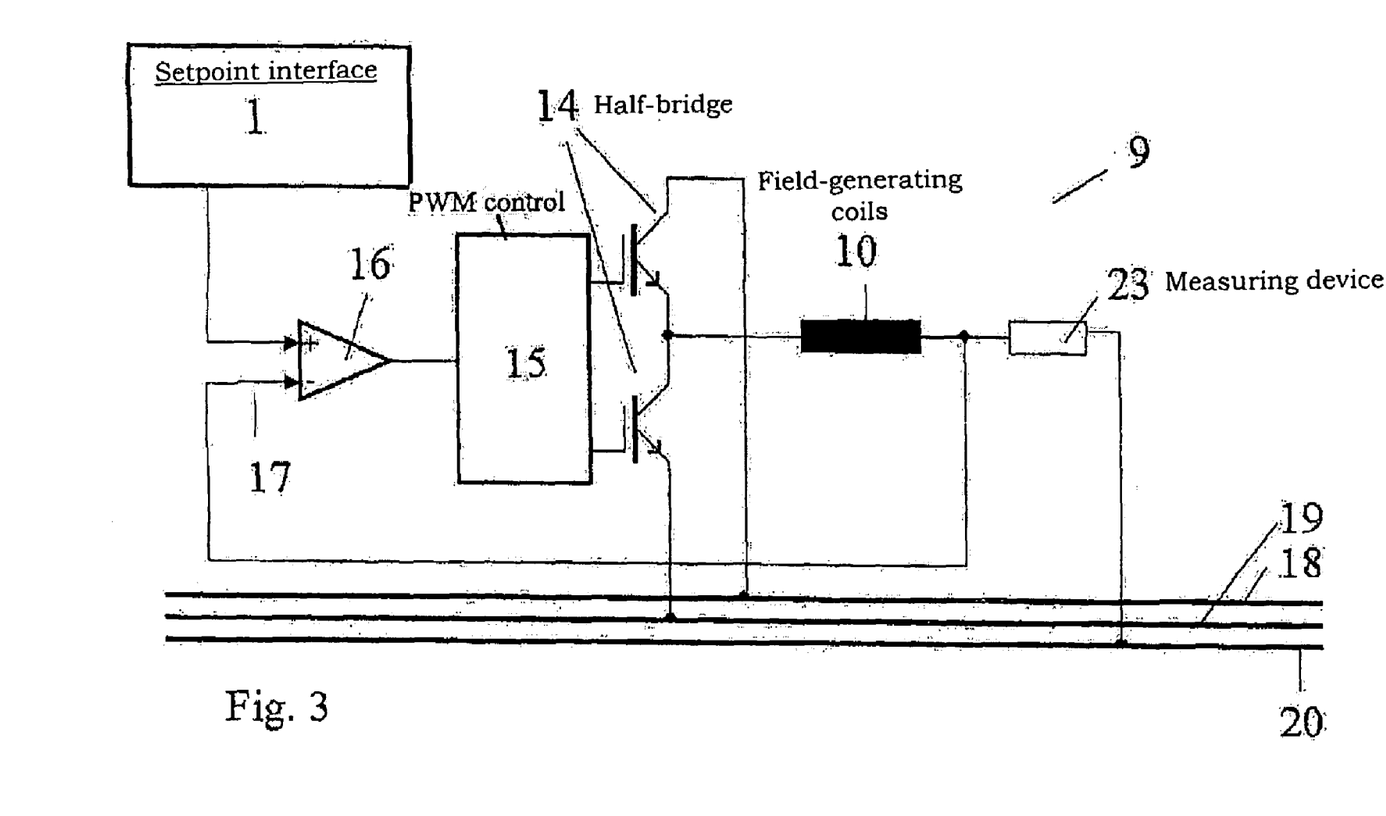
FIG. 3 schematically illustrates the triggering of an individual coil in detail.

In a 3-phase system as shown in FIG. 2, a separate coil controller 9 supplies each third coil with current having an identical phase position. Here, coil controller 9 (FIG. 1; FIG. 3) is merely indicated by a transistor symbol. During the movement of the secondary component along path 21, setpoint interfaces 1 situated on the bottom of the secondary component are traveling along the path and pass their corresponding interfaces on the primary component in the process. This leads to the already mentioned commutation of the coil current in accordance with the movement progression. If secondary component interface 1 of secondary component 7 leaves the sensing range of the interface on primary component 8, the current in the affected coils will be shut off. If the system reaches a new interface, the coil current will be activated, which then drives the secondary component in the desired direction. Using the setpoint transmitted to coil controller 9, there is the additional possibility of influencing the progressive movement, for instance so as to increase the speed or acceleration as a function of a load or for an input by a centralized control device.

FIG. 3 shows coil controller 9 in the form of a schematic basic circuit diagram. A setpoint current for the triggering of the coils received from setpoint interface 1 is compared with the instantaneous actual current value 17 of the coils. This actual value is determined directly, via a measuring device 23. The result of this comparison is conveyed to a pulse-width modulator 15, which triggers a field-generating coil via two IGBT's connected as half-bridge 14. In this example, coil controller 9 therefore includes a comparator 16, PWM controller 15, half-bridge 14 as well as a measuring device 23. Additional components may be necessary depending on the required tasks in each case. Coil controller 9 receives the input signals from setpoint interface 1 and from actual value feedback 17. The output signal is directly used for supplying field-generating coils 10. The supply voltage of the device is a bipolar power supply characterized by power supplies 18 and 19. The actual current value is measured relative to mass 20. Additional developments for triggering the coils are possible.

Figure 4:
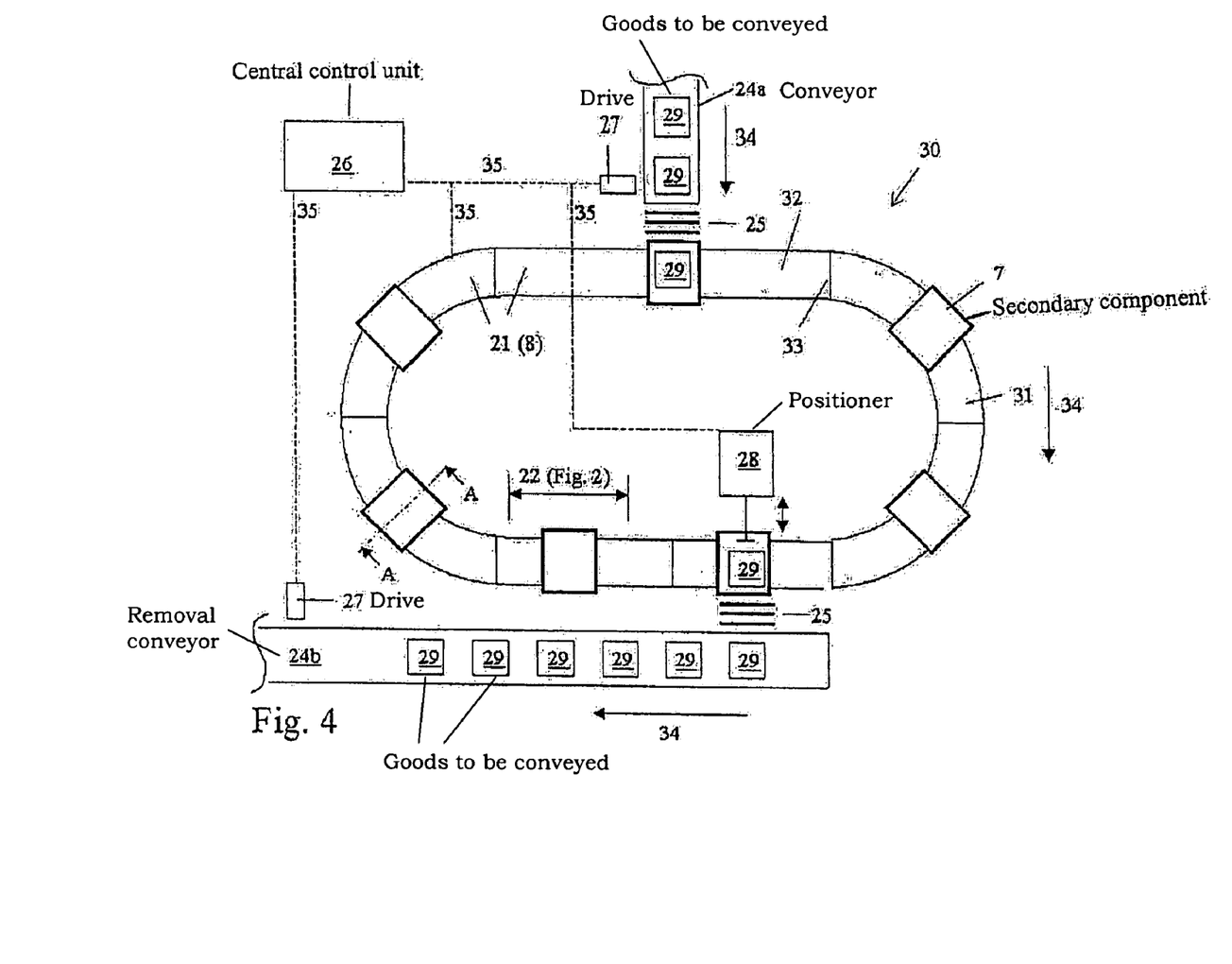
FIG. 4 is a schematic view of an industrial machine based on an example embodiment of the present invention.

FIG. 4 shows an industrial machine 30, e.g., an automated system for conveying goods 29 (boxes, any type of material) which includes a path 21 configured in the form of a "race track". Path 21 includes curve modules 31 and straight modules 32, the modules abutting each other at transitions 33. Straight and curved path sections 31/32 are represented by correspondingly configured secondary components 8 of the linear motor. Path section 22 is shown once more in greater detail in FIG. 2. In this example, seven secondary components are moving on path 21. Also shown are two conveyor belts 24a/b having conveyor rollers 25 and drives 27 as well as a positioning plunger 28 and a higher-order central controller 26, which communicates with the units to be triggered via data bus 35.

The system operates as follows: Central controller 26 regulates the entire process of the system and predefines the working cycle for conveyor belts 24a/b and the secondary components. It is assumed that the working cycle of conveyor belts 24a/b differs, i.e., belt 24a is operated at a different speed than belt 24b. The task of path 21 is to convey goods from conveyor belt a to conveyor belt b such that a continuous operation may be ensured, i.e., no idle time occurs or even collisions of transport goods 29. Conveyor belt 24a supplies goods 29 such as boxes, which—due to their prior acceleration and inertia and possibly a slight gradient—are conveyed with the aid of transport rollers 25 to a secondary component 7 appropriately positioned by central controller 26. After transport good 29 has been placed on secondary component 7 (which may be checked by a sensor) it begins to move in conveyance direction 34 indicated in the drawing, the package being delivered to the second conveyor belt 24b, which in turn removes transport goods 29. A positioner 28 having a telescope-type plunger and/or piston/cylinder unit pushes transport good 29 from secondary component 7 onto conveyor belt 24b for this purpose, once again with the aid of transport rollers 25. In this example, path 21 is used to synchronize two conveyor belts having different conveyance speeds. It is the arrangement hereof that allows the high acceleration and braking operations required to realize such a synchronization.

In the previous example, path 21 is formed in the horizontal plane. However, for other application purposes, it is also possible to define the path in the vertical plane, for instance in order to realize a VFFS (vertical form fill and seal) machine. Any combination of two, three or more identical or also different paths 29 is possible. A slanted installation is possible as well, for instance in order to compensate for differences in height. Even a Möbius strip conveyor belt for the conveying and/or simultaneous rotation of transport goods 29 about a specific angle may be realized. In summary, the foregoing may provide the basis for a multitude of possible applications in the automation and packaging industries and for realizing many systems or solving many problems as may be conventional. Additional examples are the packaging of boxes, filling of containers, sorting of objects, folding of boxes, among many others.

Figure 5:
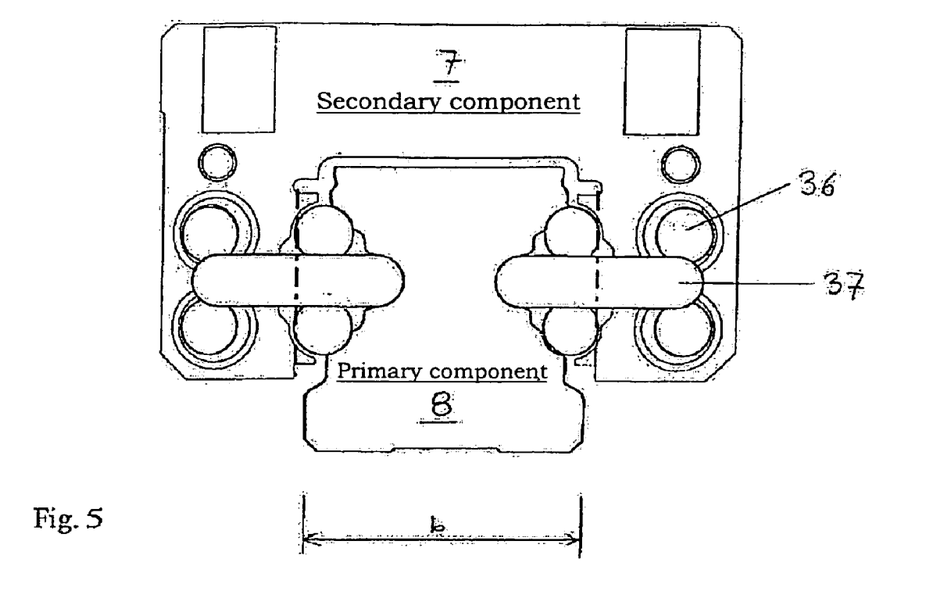
FIG. 5 schematically illustrates a possible implementation of the support of the secondary component on the primary component.

FIG. 5 is a schematic, cross-sectional view of one possible manner of supporting secondary component 7 on primary component 8, which is arranged as track (section A-A, FIG. 4). Shown are secondary component 7 and primary component 8 as well as rollers 37, balls 36 behind the rollers, and guide grooves along tracks 8. The rollers and balls for guiding secondary component 7 engage with these grooves. This may be a combination of roller and ball guides as may be conventional, for instance from the product assortment offered by Bosch Rexroth Linear Motion and Assembly Technologies. By tapering width b of the path sections in curved regions, for instance, a rapid and even movement in transition 33 (FIG. 4) from a straight to a curved path section may be ensured. While the rigidity may be reduced by the tapering and the play of the system may be slightly increased in these areas, this may be negligible in practice, since the required precision in the movement may be limited to the straight path sections.

A pure roller guidance may be possible as well. Such guidance systems may be developed specifically for the handling and automation technologies.

Ball-track guideways, which may be used as well, are characterized by high carrying capacity and high rigidity in all categories of precision and are suitable for virtually all tasks in connection with precise linear movements. Roller-track guides, due to the design-related rigidity, may allow even the heaviest loads to be moved with very little effort and with the degree of precision demanded by users of high-capacity tool machinery and robots. The roller-supported linear guideways are available in different classes of accuracy. They are characterized by high tolerated speeds, compact design, very low weight, simple installation and low friction. The extremely low-noise travel may be a factor as well.

Using a combination of ball rollers and a profile rail to accommodate ball rollers on the top and bottom sides (such as from Bosch Rexroth Linear Motion and Assembly Technologies), secondary components 7 may be moved easily and steered via primary components 8. Secondary components 7 may then have to be provided with spherical indentations to accommodate the balls. Ball rollers have an excellent track record as components in feeding systems and conveyors on processing machines and packaging systems. Supplementary rails may be used when there are higher demands on the movement precision.

Additional methods for configuring the path sections which may be conventional in linear technology may be possible. Available documents in this context may be consulted. However, design approaches may be analyzed with respect to their suitability for the application-specific demands. In the example shown, such demands may be relatively high due to accelerations of up to 15 g, speeds of up to 5 m/s and positional accuracy in the range of a few micrometers. Metals such as steel or aluminum are suitable as would be plastic.

| LIST OF REFERENCE NUMERALS | |
|---|---|
| 1 | setpoint interface |
| 2 | air gap with traveling field |
| 3 | energy interface |
| 4 | sensor interface |
| 5 | control interface |
| 6 | signal-processing device |
| 7 | secondary component |
| 8 | primary component |
| 9 | coil controller |
| 10 | field-generating coils |
| 11 | energy source |
| 12 | movement-state sensor |
| 13 | control connection |
| 14 | half-bridge |
| 15 | PWM control |
| 16 | comparator |
| 17 | actual-value generator |
| 18 | supply voltage having polarity a |
| 19 | supply voltage having polarity b |
| 20 | mass |
| 21 | path |
| 22 | path section |
| 23 | measuring device |
| 24 | conveyor belt |
| 24 | conveyor |
| 24b | removal conveyor |
| 25 | conveyor rollers |
| 26 | central control unit |
| 27 | drive |
| 28 | positioner |
| 29 | goods to be conveyed |
| 30 | industrial machine |
| 31 | curve module |
| 32 | straight module |
| 33 | transition |
| 34 | conveyance direction |
| 35 | data bus |
| 36 | ball |
| 37 | roller |

What is claimed is:

1. A linear motor, comprising:
at least one primary component having field-generation coils arranged as one of (a) concentrated and (b) overlapping windings lined up next to each other along a predefined path;
at least one secondary component supplied via an energy and information data transmission interface, the secondary component including at least one permanent magnet and a signal processor device including one of a progressive movement and movement controller adapted to generate at least one setpoint with respect to a coil controller, the setpoint supplied by a setpoint interface as a variable for commutation by the secondary component of the coil controller, stationary relative to the primary component; and
a device adapted to rigidly support the secondary component and guide the secondary component along the predefined path.

2. The linear motor according to claim 1, wherein the linear motor is adapted for a modular conveyor system including straight and curved path sections that form a path.

3. The linear motor according to claim 1, wherein the secondary component received movement-state information by at least one sensor interface from a movement-state sensor mounted in a region of the primary component.

4. The linear motor according to claim 3, wherein the movement-state information includes information corresponding to at least one of (a) speed, (b) acceleration, (c) relative position, (d) absolute position and (e) shear force.

5. The linear motor according to claim 3, wherein the secondary component received movement setpoints, from at least one control device via at least one control interface mounted in a region of the primary component.

6. The linear motor according to claim 5, wherein the movement setpoints correspond to at least one of (a) speed, (b) acceleration, (c) relative position, (d) absolute position and (e) shear force.

7. The linear motor according to claim 5, wherein at least one control device is arranged in a decentralized manner and includes control modules arranged in a region of the primary component.

8. The linear motor according to claim 5, wherein the control device administers specific features of at least one secondary component for the control thereof and transmits and receives then via a control interface.

9. The linear motor according to claim 8, wherein the specific features include identifying features.

10. The linear motor according to claim 8, wherein the signal processor device administers specific features of the secondary component for the control thereof and transmits and receives them via a control interface.

11. The linear motor according to claim 10, wherein the specific features include identifying features.

12. The linear motor according to claim 9, wherein at least one identifying feature includes a unique address that addresses at least one secondary component.

13. The linear motor according to claim 1, wherein at least one of (a) a control interface, (b) a sensor interface, and (c) the setpoint interface is non-contacting.

14. The linear motor according to claim 13, wherein at least one of the interfaces is arranged as an infrared interface.

15. The linear motor according to claim 14, wherein a sensor system is shielded from an environment in a fluid-tight manner by a transparent seal.

16. The linear motor according to claim 13, wherein at least one interface is arranged as an inductive interface.

17. The linear motor according to claim 13, wherein at least one interface is arranged as a radio interface.

18. The linear motor according to claim 3, wherein at least two interfaces are combined to form at least one uniform interface.

19. The linear motor according to claim 1, wherein the setpoint generated by the signal processor device belongs to a single setpoint category.

20. The linear motor according to claim 19, wherein the setpoint generated by the signal processor device includes at least one of (a) a position setpoint, (b) a speed setpoint, (c) an acceleration setpoint, (d) a current setpoint, and (e) a voltage setpoint.

21. The linear motor according to claim 19, wherein the setpoint generated by the signal processor device includes at least two of (a) a position setpoint, (b) a speed setpoint, (c) an acceleration setpoint, (d) a current setpoint, and (e) a voltage setpoint.

22. The linear motor according to claim 1, wherein an energy supply of the signal processor device is provided by a single type of energy source.

23. The linear motor according to claim 22, wherein the energy supply includes an energy source affixed on the secondary component.

24. The linear motor according to claim 23, wherein the energy source includes at least one of (a) a chargeable accumulator, (b) a non-chargeable battery and (c) a solar cell system.

25. The linear motor according to claim 23, wherein the energy supply includes an inductive energy interface arranged to up electrical energy in a non-contacting manner via at least one coil which is stationary relative to the primary component.

26. The linear motor according to claim 25, wherein the inductive energy interface includes an induction coil.

27. The linear motor according to claim 22, wherein a pick-up mounted on the secondary component and in contact with the primary component conveys the energy to the signal processor device.

28. The linear motor according to claim 22, wherein a pick-up mounted on the secondary component and in contact with the primary component conveys the energy to the signal processor device via one of (a) a sliding contact and (b) a roller contact.

29. The linear motor according to claim 22, wherein the energy for the signal processor device is supplied by a cable connection.

30. The linear motor according to claim 1, wherein an energy supply of the signal processor device is provided by a combination of different types of energy sources.

31. The linear motor according to claim 1, wherein, for non-contacting transmission of at least one of (a) energy and (b) information data, communications devices of the secondary component and the primary component are arranged opposite one another during operation, at sides of the secondary component and the primary component facing one another.

32. The linear motor according to claim 1, wherein individual coils on the primary component are arranged next to each other along the movement path of the secondary component, and the coil controller adapted to supply at least one individual coil with current.

33. The linear motor according to claim 1, wherein the secondary component is moveably supported on the primary component by a rail having at least two tracks.

34. The linear motor according to claim 1, wherein the secondary component includes at least three rollers, two rollers being assigned to a shared track and a third roller being assigned to an additional track.

35. The linear motor according to claim 34, wherein the third roller is flexibly supported on the secondary component.

36. The linear motor according to claim 1, wherein a control element arranged as half-bridge in each case is connected to an individual coil mounted on the primary component and feeds a coil current whose orientation and intensity are defined by a trigger signal as specified by the setpoint.

37. The linear motor according to claim 36, wherein a number n of control elements arranged as half-bridges are connected to one of n individual coils mounted on the primary component.

38. The linear motor according to claim 37, wherein a plurality of control elements arranged as half-bridges are connected to one of n individual coils mounted on the primary component in a redundant manner.

39. An industrial machine, comprising:
a coil controller; and
a linear motor including:
at least one primary component having field-generation coils arranged as one of (a) concentrated and (b) overlapping windings lined up next to each other along a predefined path;
at least one secondary component supplied via an energy and information data transmission interface, the secondary component including at least one permanent magnet and a signal processor device including one of a progressive movement and movement controller adapted to generate at least one setpoint with respect to the coil controller, the setpoint supplied by a setpoint interface as a variable for commutation by the secondary component of the coil controller, stationary relative to the primary component; and
a device adapted to rigidly support the secondary component and guide the secondary component along the predefined path.

40. The machine according to claim 39, wherein the industrial machine is adapted for automated lanes, which include an industrial process including a linear movement.

41. The machine according to claim 40, wherein the industrial process includes an industrial process for at least one of (a) flat stocks, (b) packaging and (c) tools.

42. The machine according to claim 39, wherein the machine includes a plurality of secondary components which execute a process-synchronous movement according to predefined process rules.

43. The machine according to claim 42, wherein the machine includes at least five secondary components.

44. The machine according to claim 40, wherein the linear movement is predefined by a movement path that is formed by a plurality of primary components each having a predefined length in the manner of an assembly kit.

45. The machine according to claim 44, wherein the movement path includes at least one of (a) straight and (b) curved primary components.

46. The machine according to claim 42, wherein a higher-order process controller monitors and controls movement sequences.

47. The machine according to claim 46, wherein the process controller prevents a collision of secondary components.

48. The machine according to claim 46, wherein the process controller implements an initialization of all secondary components upon start-up.

49. The machine according to claim 46, wherein the process controller monitors and controls the transition of the secondary components between two primary components to avoid transition interruptions and to ensure continuity in the position sensing.

50. The machine according to claim 39, wherein the machine is adapted package goods.

51. The machine according to claim 39, wherein the machine is adapted to package at least one of (a) particular food items and (b) luxury food stuffs.

52. The machine according to claim 51, wherein components of the machine are at least one of (a) watertight and (b) splash-proof.

53. The machine according to claim 39, wherein the machine is adapted to perform one of (a) a subfunction of a tool machine and (b) a function of an automated lane or conveyor lane.

54. The machine according to claim 39, wherein the machine is arranged as a printing machine.

55. The machine according to claim 39, wherein the machine is arranged as a sheet-metal processing machine.

* * * * *